March 22, 1960  E. M. RAMBO ET AL  2,929,142
CHEESE MOLDING MACHINE
Filed Oct. 14, 1957  3 Sheets-Sheet 1

Eivind M. Rambo
John M. Frigo  INVENTORS

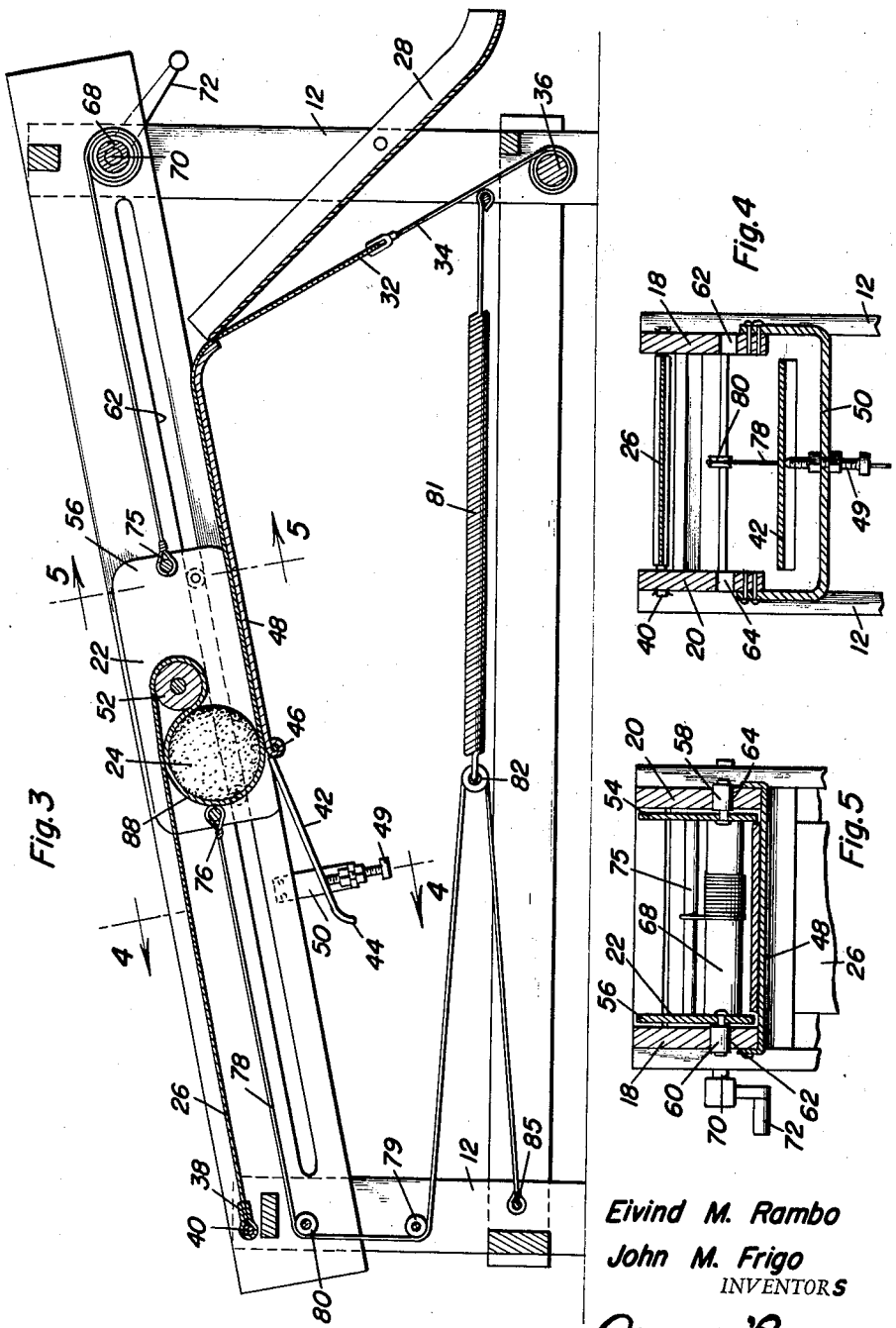
Eivind M. Rambo
John M. Frigo
INVENTORS

March 22, 1960
E. M. RAMBO ET AL
2,929,142
CHEESE MOLDING MACHINE
Filed Oct. 14, 1957
3 Sheets-Sheet 3
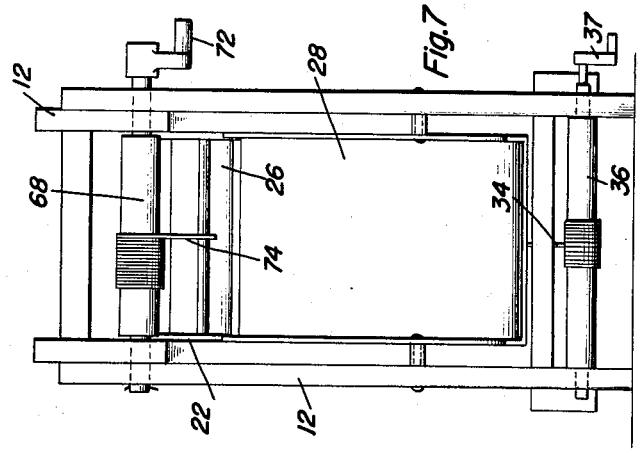
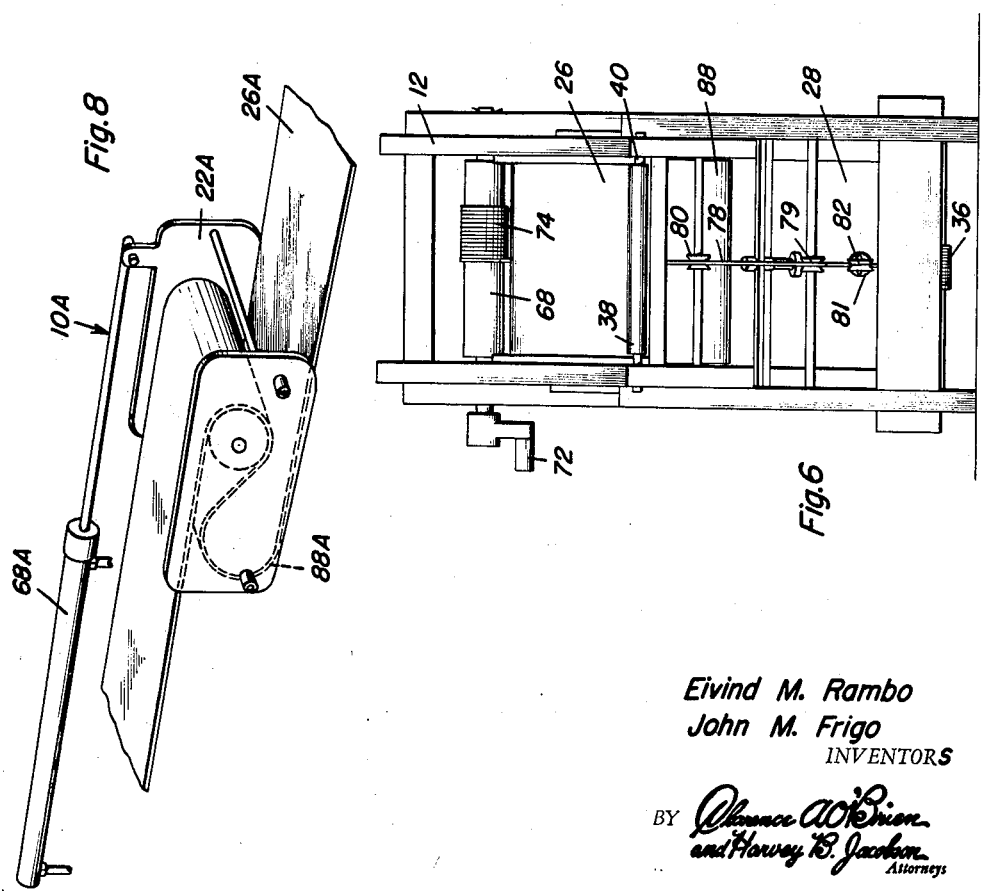
Eivind M. Rambo
John M. Frigo
INVENTORS
BY *Clarence A. O'Brien
and Harvey B. Jackson*
Attorneys United States Patent Office 2,929,142
Patented Mar. 22, 1960

2,929,142
CHEESE MOLDING MACHINE
Eivind M. Rambo, Ogdensburg, and John M. Frigo, Lena, Wis.
Application October 14, 1957, Serial No. 689,959
4 Claims. (Cl. 31—42)

This invention relates to a machine for making cheese.

Although there is a number of different processes involved and necessary for the production of various types of cheese, there is a large segment of cheese production which is presently thought to require hand molding. Our machine makes cylinders of cheese in which the curds are knit together. The cylinders of cheese can then be placed into molds of various shapes for the best marketing. Our machine replaces hand molding in this type of cheese process. Being a machine, the processing is uniform from one curd to the next and eliminates the danger of locking into the curd free fat and moisture which sometimes happens during hand molding. The result is that our machine forms a more consistent product and much more quickly and with far less effort.

A machine constructed in accordance with the invention can be made of any size and dimension determined by the size of product. The machine is capable of producing cheese for molding and forming different types such as Provolone, Mosseralla and Scamorze and all other types of cheese that require molding or pressing.

The machine element of principal importance is the flexible belt that is anchored at both ends plus a carriage containing a roller which serves to reverse the direction of the belt and also to form a loop in the belt in which the curd is formed. The sides of the carriage seal the ends of the curd as the forming takes place. The carriage can be moved by any means from manual to automatic. All that is necessary to operate the machine and perform a machine molding operation on a curd, is to have the carriage in the starting position which provides a loop in the belt in which to drop the curd. Then the carriage is moved and the curd is rolled and compressed into a cylinder of a predetermined size depending on the size and weight of curd that is dropped into the loop of the belt. The combined action of the belt and rubbing action of the sides of the carriage cause the curd to form, knit and be sealed on all surfaces. When the carriage reaches the end of its cycle of operation the curd drops out onto a slide and the machine is then made ready for the next operation.

Our machine does a much better job in a shorter time than can be done by hand. Moreover the quality and uniformity of the product is superior.

Other objects and features of importance such as mechanical simplicity will become apparent in following the description of the illustrated form of the invention.

Figure 3 is a longitudinal sectional view taken on the line 3—3 of Figure 1 and showing the carriage, curd and other parts of the machine in an intermediate stage of a cycle of operation.

Figure 4 is a transverse sectional view taken on the line 4—4 of Figure 3.

Figure 5 is a sectional view taken on the line 5—5 of Figure 3.

Figure 6 is an end view of the machine.

Figure 7 is the opposite end view of the machine.

Figure 8 is a fragmentary perspective view of a modification wherein the manual means for operating the machine are removed in favor of hydraulic means.

Figure 1:
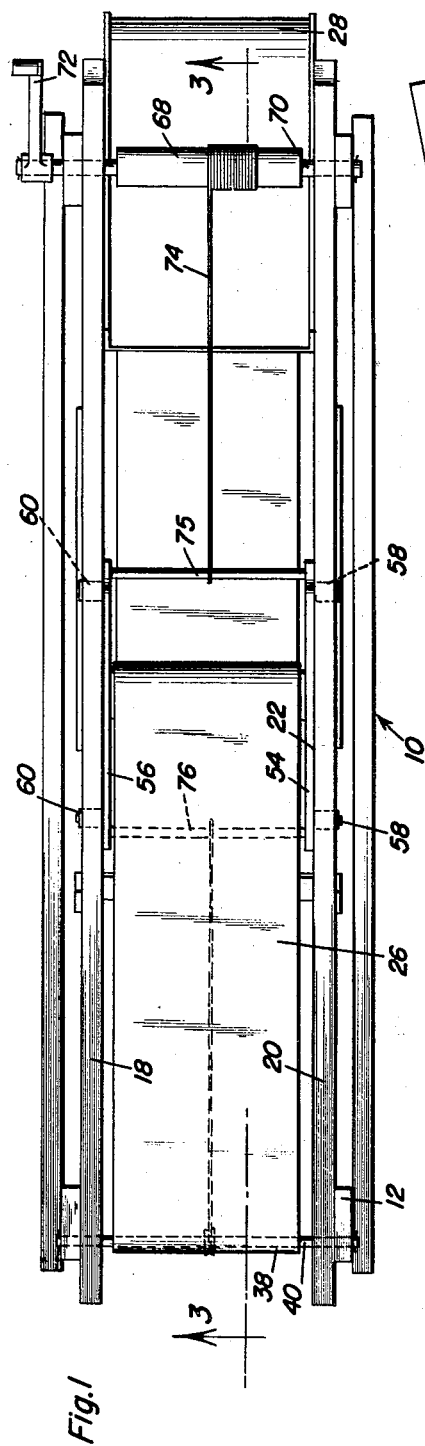
Figure 1 is a top view of a machine constructed in accordance with the invention.

In the accompanying drawings there is a machine 10 which is constructed in accordance with the invention. This machine has four legs 12 which are braced as at 14 and which support an inclined trough 16. This trough has sides 18 and 20 which enter into the processing in that they guide carriage 22 during its cured treatment.

Curd 24 (Figure 2) is shown entering our machine when carriage 22 is in the starting position. The curd 24 is propelled up the chute by the carriage and during the time of propulsion, the curd is acted on by belt 26. At the end of the travel of carriage 22, the cheese is automatically discharged down the chute 28 that registers with guide 30 over which belt 26 is entrained. Belt 26 is flexible and has both ends anchored. One end 32 of the belt is attached to a cable 34 which is in turn, attached to spindle 36 that extends between a pair of the legs. Crank 38 on spindle 36 is used to turn the spindle and thereby tighten the belt 26. A ratchet and pawl (unshown) or any other kind of locking device may be used to hold the spindle 36 in the adjusted position. The opposite end 38 of belt 26 has a loop formed in it and is fitted over the transverse spindle 40 carried by the sides 18 and 20 of trough 16.

Flexible belt 26 is entrained over a guide 42 in the form of a plate that has a down turned end 44 and which is connected by hinge 46 to a fixed flat panel 48 that constitutes a part of the fixed bottom of the trough. Guide 42 forms a part of the bottom of the trough, but it is movable about the hinge 46. Guide 42 remains in the lower position by gravity. The lower limit of the travel of the guide is adjustable by setscrew 49 which constitutes a stop for the guide 42 by engaging the lower surface of the guide. The setscrew is mounted for adjustment in a yoke 50 whose sides are attached to sides 18 and 20 of trough 16. Guide 42 is adjustable as determined by the size of curd which is to be handled. As mentioned previously guide 42 is at one end of the fixed panel 48 that constitutes the fixed part of the bottom of the trough. The guide 30 is at the opposite end of this fixed panel and communicates chute 28 with the bottom of the trough.

Belt 26 is entrained over a transverse roller 52 which is mounted for rotation on an axle that is carried by the sides 54 and 56 of carriage 22. These sides also have guides preferably in the form of pairs of rollers 58 and 60, there being two on each side 54 and 56 of the carriage. The rollers are held captive in elongated slots 62 and 64 that are in the sides 18 and 20 of trough 16. Hence, the rollers not only function as guides but they also constrain the movement of the carriage to longitudinal movement relative to trough 16 and they also establish the limits of travel of the carriage. After passing over roller 52, the belt passes over the bottom of the trough, the bottom including guide 42 and guide 30 as well as fixed panel 48. The belt then passes between guide 30 and the bottom of chute 28 and is attached to the slack take-up or adjusting means constituted by cable 34, roller 36 as well as the handle 37 and locking device.

Figure 2:
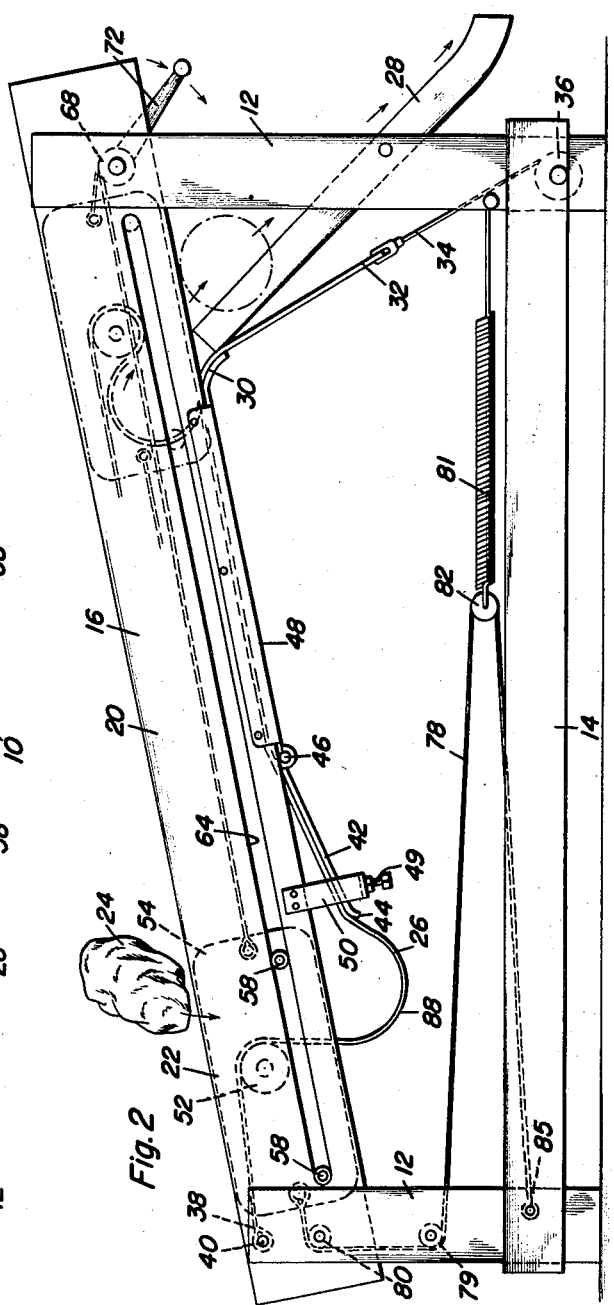
Figure 2 is a side view of the machine in Figure 1, this view having a broken line position of the carriage and belt showing the cheese being discharged and having in full line position, the relative locations of the parts when the curd is received in the belt loop.

There are positive acting means for moving the carriage 22 up the chute that is, from the starting position shown in Figure 2 to the discharge position shown in broken lines in Figure 2. These means consist of a roller 68 that is secured to spindle 70. This spindle is passed through aligned holes in the sides of the trough 16 and in the illustrated form of the invention, holes in the legs as well. Crank 72 is at the end of spindle 70 so that it can be manually rotated in order to wind cable 74 thereon. One end of the cable is attached to the roller 68 and the other end is attached to the rod 75 on carriage 22 and at the front end thereof. This rod is secured to the sides of the carriage, as is rod 76 which is at the rear end of the carriage.

Means for returning the carriage after it is propelled up the trough by cable 74, are automatically operative. They consist of a cable 78 that is attached to the rod 40. The cable is entrained over idler pulleys 79 and 80 that are on spindles carried by the rear legs of our machine. Cable 78 is entrained over an idler 82 at the end of a spring 81. The opposite end of the spring is anchored and the spring is adapted to be stretched as the carriage moves up the trough inasmuch as the end of cable 78 is anchored to an anchor rod 85. Hence, as the carriage moves up the trough, spring 81 is stretched. When the limit of travel is reached, that is when the cheese is dropped onto chute 28, the crank 72 is released allowing spring 81 to return the carriage to the initial or starting position.

In use a curd 24 is dropped into the loop 88 of the belt 26, this loop being formed by slack in the belt at the front part of the carriage. Then the handle or crank 72 is operated thereby pulling the roller 52 over the curd 24 and causing loop 28 to form behind roller 53 as the loop with the curd 24 captive therein, moves up the guide 42. This action also automatically compresses the curd and does so uniformly from one curd to the next provided that similar size curds are fed to the machine. The size of curd is comparatively easy to control.

As the handle 32 is continued to be operated, the carriage moves up the chute with the loop 88 coming over the fixed panel 48 of the trough 16 until guide 30 begins to allow the curd to discharge onto chute 28.

The described machine is an elementary embodiment of our invention. It is hand operated for the most part with the only automatic feature being the spring 81 which returns the carriage to the starting position and this automatically causes the belt to have its curd accepting loop formed in it. In Figure 8 we illustrate an embodiment of our invention. Here machine 10a has all of the essential features of the described machine, including carriage 22a, belt 26a that has loop 88a therein. However, in place of the crank 72, roller 78 and other attendant structure, we provide a double acting hydraulic cylinder 68a which is operatively connected to the carriage. One end of the hydraulic cylinder is attached to the carriage while the other end is fixed to the frame of the machine. By the use of standard controls carriage 22a is made to move up and down the trough in the manner previously described. Moreover, other embodiments contemplate the use of other mechanical, electrical or fluid drives. Our invention may also be practiced without having the trough on an incline or by using means other than a trough for constraining the travel of the carriage. All other modifications which fall within the purview of the following claims may be resorted to without departing from the invention.

What is claimed as new is as follows:

1. A machine for molding cheese, said machine comprising an upwardly opening trough having sides and a flat bottom, a guide hingedly connected to one end of said bottom and forming a longitudinal extension of said flat bottom, adjusting means connected to said guide for adjusting the hinged position of said guide, a flexible belt having an intermediate portion on said bottom and said guide, means fixing the ends of said belt, a carriage having an open bottom and side walls which fit between said trough walls, carriage guiding means connected to and extending outwardly from said carriage side walls, said trough walls having slots extending lengthwise thereof and in which said carriage guiding means are disposed to thereby constrain the movement of said carriage and also support the carriage on said trough side walls, means connected to said carriage to propel the carriage in said trough, said belt having a loop therein between the ends thereof which constitutes a cheese curd receiving and retaining loop as said carriage is propelled in said trough, and a roller extending transversely across said carriage walls and contacting the loop in said belt to retain said loop with the cheese therein as said carriage traverses said trough.

2. The machine of claim 1 wherein said flat trough is inclined with reference to a horizontal plane, and yielding means opposing the upward movement of said carriage in said inclined trough.

3. The machine of claim 2 wherein said adjusting means comprise a bracket secured to said trough, and a setscrew carried by said bracket and engaging said guide.

4. The machine of claim 2 wherein said means fixing the ends of said belt include a spindle to which one end of the belt is secured so that said belt may be wound thereon to adjust the effective length of the belt and consequently the size of the loop therein.

References Cited in the file of this patent

UNITED STATES PATENTS

| 2,038,866 | Whittles | Apr. 28, 1936 |
| 2,750,723 | Fisher | June 19, 1956 |

FOREIGN PATENTS

| 137,759 | Australia | June 28, 1950 |